(12) United States Patent
Senba

(10) Patent No.: US 7,756,410 B2
(45) Date of Patent: Jul. 13, 2010

(54) CAMERA ACCESSORY AND CAMERA

(75) Inventor: Takehiko Senba, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 623 days.

(21) Appl. No.: 11/594,109

(22) Filed: Nov. 8, 2006

(65) Prior Publication Data

US 2007/0110428 A1 May 17, 2007

(30) Foreign Application Priority Data

Nov. 14, 2005 (JP) ............................. 2005-328822

(51) Int. Cl.
G03B 15/03 (2006.01)

(52) U.S. Cl. .................. 396/155; 396/281; 396/299; 362/8

(58) Field of Classification Search .............. 396/106, 396/159, 281, 302, 535, 155, 198, 201, 267, 396/282, 297, 298, 299, 289, 171, 172, 182; 348/216.1, 371, 373, 375; 362/8, 10
See application file for complete search history.

(56) References Cited

U.S. PATENT DOCUMENTS 3,962,710 A * 6/1976 Okuno et al. ............... 396/384
4,381,145 A * 4/1983 Momiyama et al. ......... 396/281
5,794,082 A * 8/1998 Matsui et al. ................ 396/56
5,862,419 A * 1/1999 Goto et al. ................. 396/121
6,614,999 B2 * 9/2003 Hagiuda et al. ............. 396/155
6,979,093 B2 * 12/2005 Tsay ............................. 362/8
2002/0131263 A1 * 9/2002 Naghi et al. .................. 362/98
2004/0027820 A1 * 2/2004 Hilmersen ...................... 362/8
2005/0265014 A1 * 12/2005 Matsui et al. ................... 362/5
2006/0014564 A1 * 1/2006 Kung ........................ 455/557

FOREIGN PATENT DOCUMENTS

JP 07-261240 A 10/1995
JP 11194405 A * 7/1999

* cited by examiner

Primary Examiner—Rodney E Fuller
Assistant Examiner—Linda B Smith
(74) Attorney, Agent, or Firm—Sughrue Mion, PLLC

(57) ABSTRACT

A side face of an external flash device is provided with an illumination operation button, and side and lower faces thereof are provided with illumination light emitters. Each of the illumination light emitters has a built-in LED and turns on by pressing the illumination operation button. When an image is captured under a dark environment, a user can operate the operation ring, and operating dials and under the illumination.

11 Claims, 4 Drawing Sheets

CAMERA ACCESSORY AND CAMERA

FIELD OF THE INVENTION

The present invention relates to a camera accessory and a camera provided with an illuminator to illuminate an operating portion of the camera that is operated by a user.

BACKGROUND OF THE INVENTION

A camera is provided with operations such as a dial or buttons for setting a capturing mode, a sensitive dial for setting ISO sensitivity, a focus ring for adjusting a focal distance, and an aperture ring for adjusting an aperture. A user operates these operation members prior to image capturing. In order to take a beautiful photo, a camera having various functions is sold in the market. The camera is generally provided with a button for selecting functions. From the reason above, the number of the buttons, dials and rings operated by the user increases.

Most cameras have a built-in flash device (hereinafter referred to as an internal flash device). The internal flash device emits small amount of light, so when a subject that is distant from the camera is captured, an external flash device is also used at the same time. The external flash device typically emits large amount of light and is attached to an accessory shoe of the camera. As disclosed in Japanese Laid-open Patent Application No. 07-261240, there is also known a camera system that enables communication between a camera and an external flash device so that the camera controls the external flash device to adjust light amount emitted from the flash device and to conduct a pre-flash for reducing red-eye.

However, when an image is captured in a dark environment such as outdoors at night or a dark room, a user needs to set a capturing condition by groping for the button, the dial and the ring or needs to prepare an extra light, which are operationally inconvenient.

SUMMARY OF THE INVENTION

An object of the present invention is to provide a camera accessory and a camera that enable to easily and securely operate an operating portion even under a dark environment.

To achieve the above object and other objects, a camera accessory and a camera of the present invention include an illumination light emitter that generates light for illuminating the operating portion. It is desirable to provide an illumination operation member (switch) for turning on the illumination light emitter when illumination is required and for turning off the illumination light emitter when illumination is not required. Turning on of the illumination light emitter in a bright place wastes battery power, so it is desirable to inhibit the turning on of the illumination light emitter when the illuminance measured by an illumination detection sensor is at least a predetermined value.

In a preferred embodiment of the camera accessory, a communication section for receiving a signal representing that an operating portion of the camera (for example, a button, a dial and a ring) is operated, and a light emitting controller for turning on the illumination light emitter when the communication section receives the signal, are provided. The light emitting controller turns off the illumination light emitter after a certain period of time since the operation of the operating portion was stopped.

In a further preferred embodiment of the camera accessory, when a release button is pressed halfway, a half-press signal is sent to the camera accessory from the camera via the communication section. The light emitting controller turns on the illumination light emitter to illuminate the operating portion of the camera. When a full-press signal representing that the release button is fully pressed is sent to the camera accessory, the illumination light emitter turns off. It may be possible to provide a touch sensor in the release button, and the illumination light emitter is turned on when the touch sensor detects contact of a user's finger.

In a preferred embodiment of the camera, the illumination light emitter turns on to illuminate an operating portion of a lens barrel when the operating portion of the lens barrel is operated. In another preferred embodiment, the illumination light emitter turns on when the release button is pressed halfway, and the illumination light emitter turns off when the release button is fully pressed. The touch sensor may be provided in the release button.

According to the present invention, the illumination light emitter provided on the external camera accessory illuminates the operating portion of the camera, thereby a user can easily and securely operate the operating portion. Moreover, the camera accessory is provided with the illumination operation member to turn on the illumination for the operating portion when needed, or the camera accessory is provided with the illumination detecting sensor to turn on the illumination for the operating portion only in dark places, so wasteful consumption of battery power can be reduced.

Furthermore, the communication section is provided between the camera and camera accessory to illuminate the operating portion in accordance with an operation of the camera, so the operating portion can be illuminated automatically when the user requires illumination. This saves the user's labor.

According to the camera of the present invention, an illumination device is provided on the camera body to illuminate the operating portion of the lens barrel.

Moreover, a power source of the illumination light emitter is set to ON state when the release button provided on the camera body is pressed halfway, and the power source can be shifted to OFF state when the release button is fully pressed, so the operation of illuminating can be simplified. Furthermore, the power source of the illumination light emitter can be shifted to OFF state automatically after a certain period of time since the half-press of the button was stopped. This prevents wasteful consumption of the battery power due to ineffective illumination and saves a user's labor to turn off the power source of the illumination light emitter.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
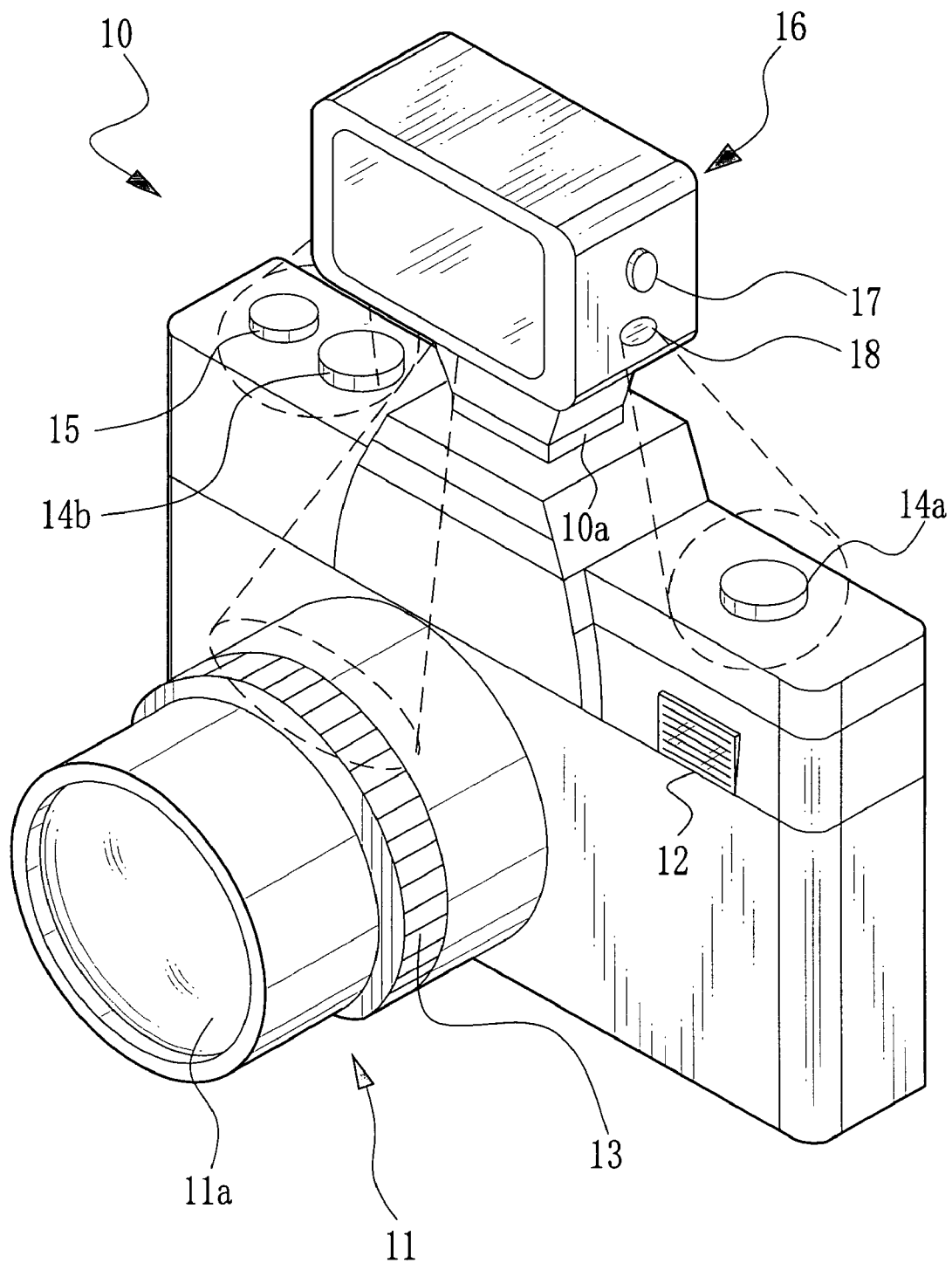
FIG. 1 is a perspective view showing a state where operating portion of a camera is illuminated by an external flash device.

In FIG. 1, a front face of a digital camera (hereinafter referred to as a camera); 10 is provided with a lens barrel 11 having a taking lens 11a and an internal flash emitter 12 that emits flashlight to a subject. The lens barrel 11 includes an operation ring 13. The operation ring 13 is, for example, a focus ring that rotates to adjust focus of the taking lens 11a. The operation ring 13 may also be an aperture ring or a zoom ring. Further, the operation ring 13 may adjust focusing and zooming by rotation thereof and adjust aperture by slide thereof. A back face of the camera is provided with an LCD (liquid crystal display) to display a through image, a recorded image, and a screen for setting capturing condition. An upper face of the camera 10 is provided with operating dials 14a and 14b and a release button 15. When a subject is distant from the camera, an external flash device 16 is used as an accessory and attached to an accessory shoe 10a. A press of the release button 15 captures one frame of still image, and the captured image is stored in a recording medium in the camera 10. The operating dials 14a and 14b are used for selecting and setting, for example, a capturing mode, a shutter speed, an ISO sensitivity, a flash mode, and a capturing location.

The external flash device 16 has an illumination operation button 17 on its side face, and illumination emitter 18 on its side and lower faces. The illumination light emitters 18 include LEDs and are turned on by a press of the illumination operation button 17. Accordingly, when an image is captured in a dark place, a user can easily read marks and scales on the operation dial 13 and the operating dials 14a and 14b to achieve a smooth image capturing.

Figure 2:
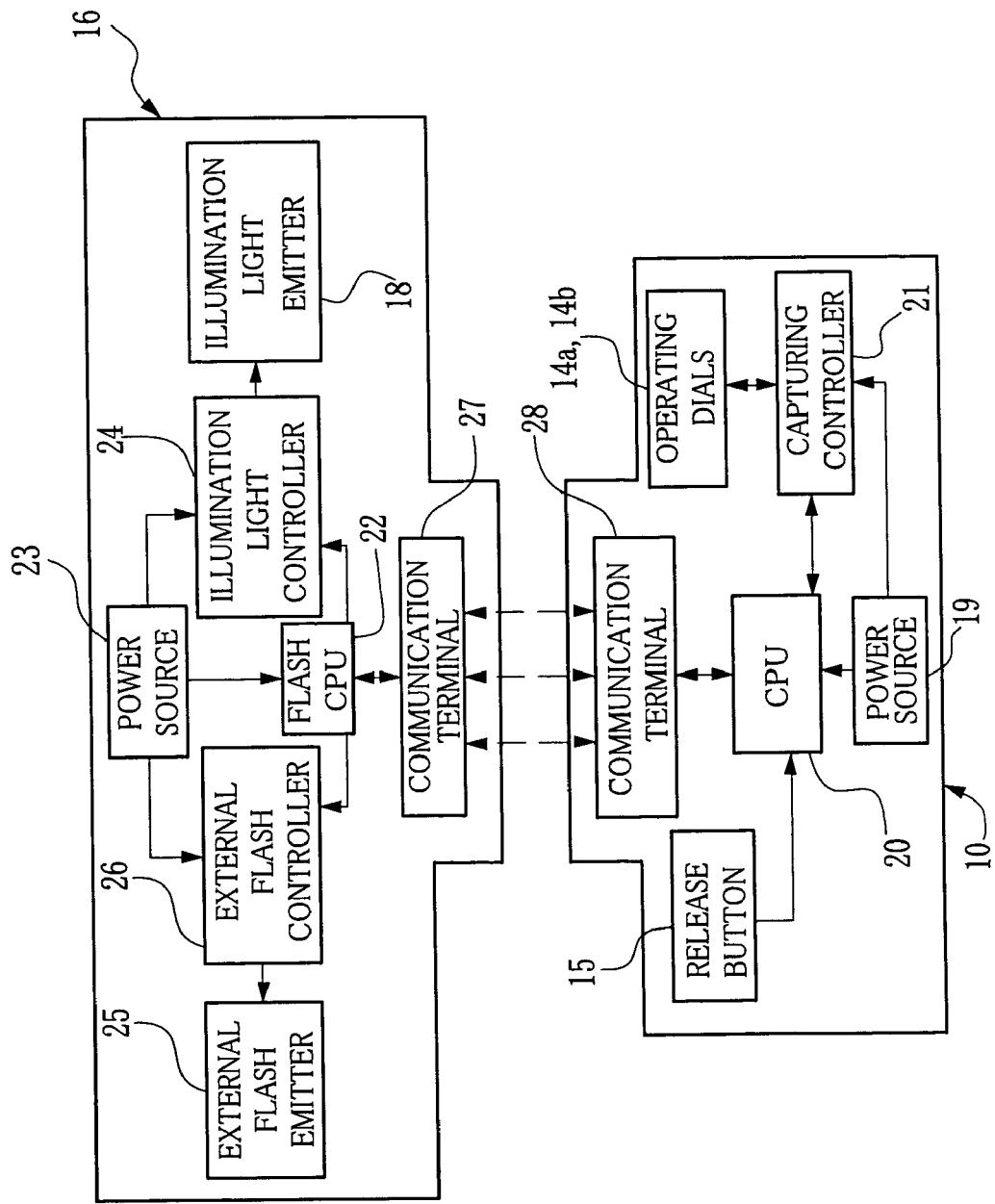
FIG. 2 is a block diagram showing the camera and the external flash unit.

In FIG. 2, the camera 10 is provided with a power source 19, a CPU 20 for performing a control process, the release button 15 for instructing image capturing, and a capturing controller 21 for conducting image capturing based on the capturing condition set by the operating dials 14a and 14b. The external flash device 16 includes a flash CPU 22 for performing a control process of the flash device 16, a power source 23, the illumination light emitters 18, an illumination light controller 24 for controlling the illumination light emitters 18, an external flash emitter 25, and an external flash controller 26 for controlling the external flash emitter 25. Moreover, communication terminals 27 and 28 are respectively provided at the connecting points of the camera 10 and the external flash device 16.

It is convenient if an illumination light source turns on interlocking with an operation of the camera without a press of the illumination operation button 17. So, when the release button 15 of the camera 10 is pressed halfway, a signal is sent to the CPU 20. The CPU 20 transmits the signal to the flash CPU 22 via the communication terminal 27. By controlling the illumination light controller 24, the flash CPU 22 makes the illumination light emitters 18 emit light. When the release button 15 is fully pressed, the flash CPU 22 turns off the illumination light emitters 18. This can prevent illumination light from entering into the taking lens 11a when an image is being captured. If the illumination light emitters 18 are turned on by a half-press of the release button 15 and are turned off by a full-press of the release button 15, the illumination light emitters 18 keep turning on even when the half-press of the release button 15 is stopped. This wastes battery power, so it is desirable to turn off the illumination after a certain period of time since the half-press of the release button was stopped.

Obviously, it may also be desirable to turn on the illumination light emitters 18 during the half-press of the release button 15 and to turn off them when the half-press of the release button 15 is stopped or the release button 15 is fully pressed.

In the above embodiment, the release button 15 of the camera 10 is pressed halfway for light emission from the illumination light emitters 18; but the present invention is not limited to this. It may be possible to combine a known touch sensor with the release button 15 to emit light from the illumination light emitters 18 when a user touches the release button 15. Moreover, it may be possible to make the illumination light emitters 18 emit light when an operating portion except the release button 15, for example, the operating dial 14a or 14b is operated.

Figure 3:
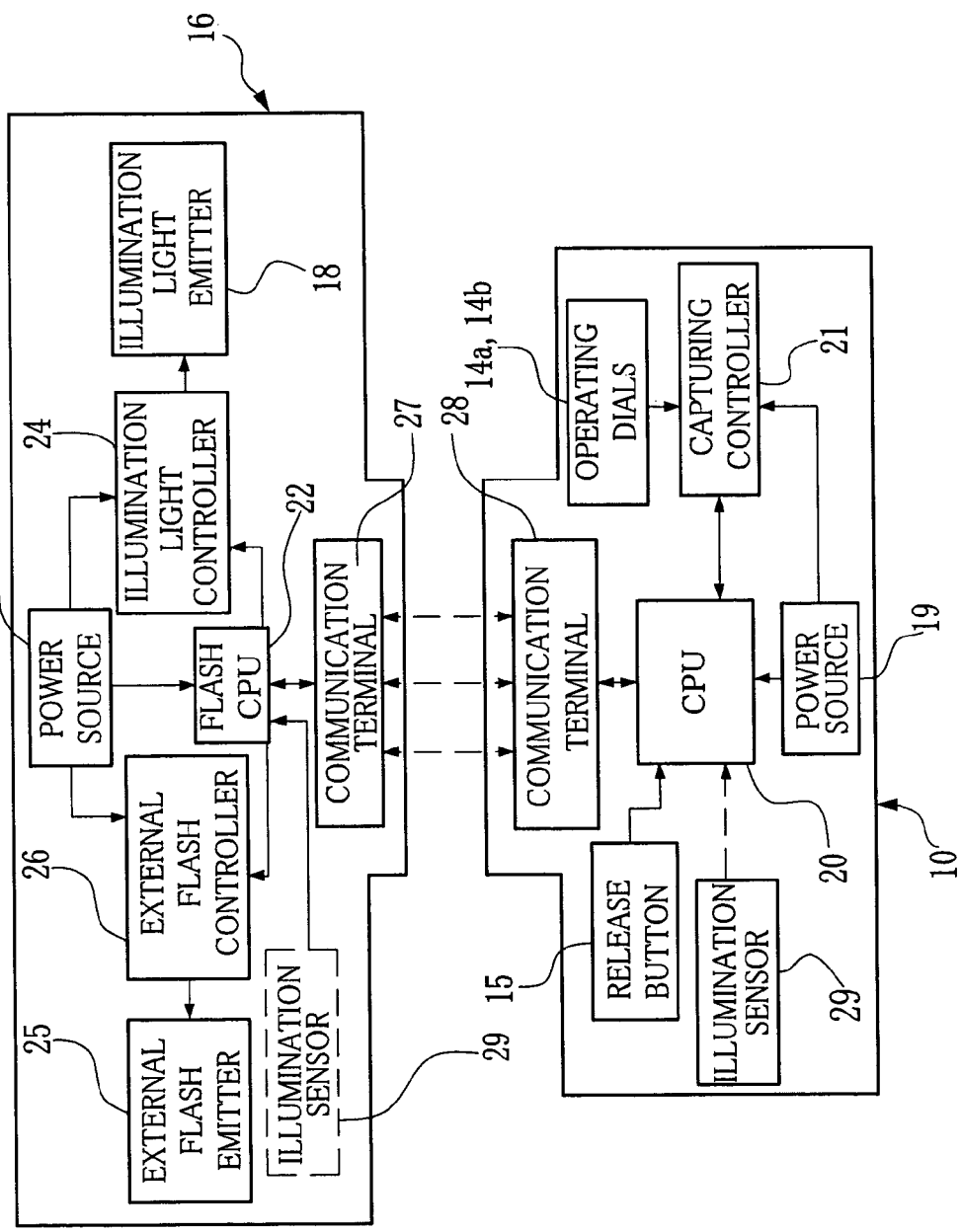
FIG. 3 is a block diagram, similar to FIG. 2, in which an illumination sensor is incorporated into the camera.

FIG. 3 shows an embodiment that the camera 10 is provided with an illumination sensor 29. In the camera shown in FIG. 2, the operation ring 13 and the operating dials 14a and 14b are illuminated even in a bright place. The illumination sensor 29 is thus incorporated to measure brightness of the capturing environment, and the CPU 20 or the flash CPU 22 judges based on the measured brightness level as to whether to activate the illumination light emitters 18 or not. Therefore, light is not illuminated under the bright capturing environments and wasteful consumption of the battery power is prevented.

In the above embodiment, the illumination sensor 29 is provided on the camera 10, but alternatively it may be provided on the external flash device 16. Moreover, the illumination sensors 29 may be provided on both of the camera 10 and the external flash device 16, in which either one whose illuminance is lower than the other is selected. Furthermore, an output signal of an imaging element for capturing image may be used for judging brightness of the capturing environment instead of using the illumination sensor 29.

Figure 4:
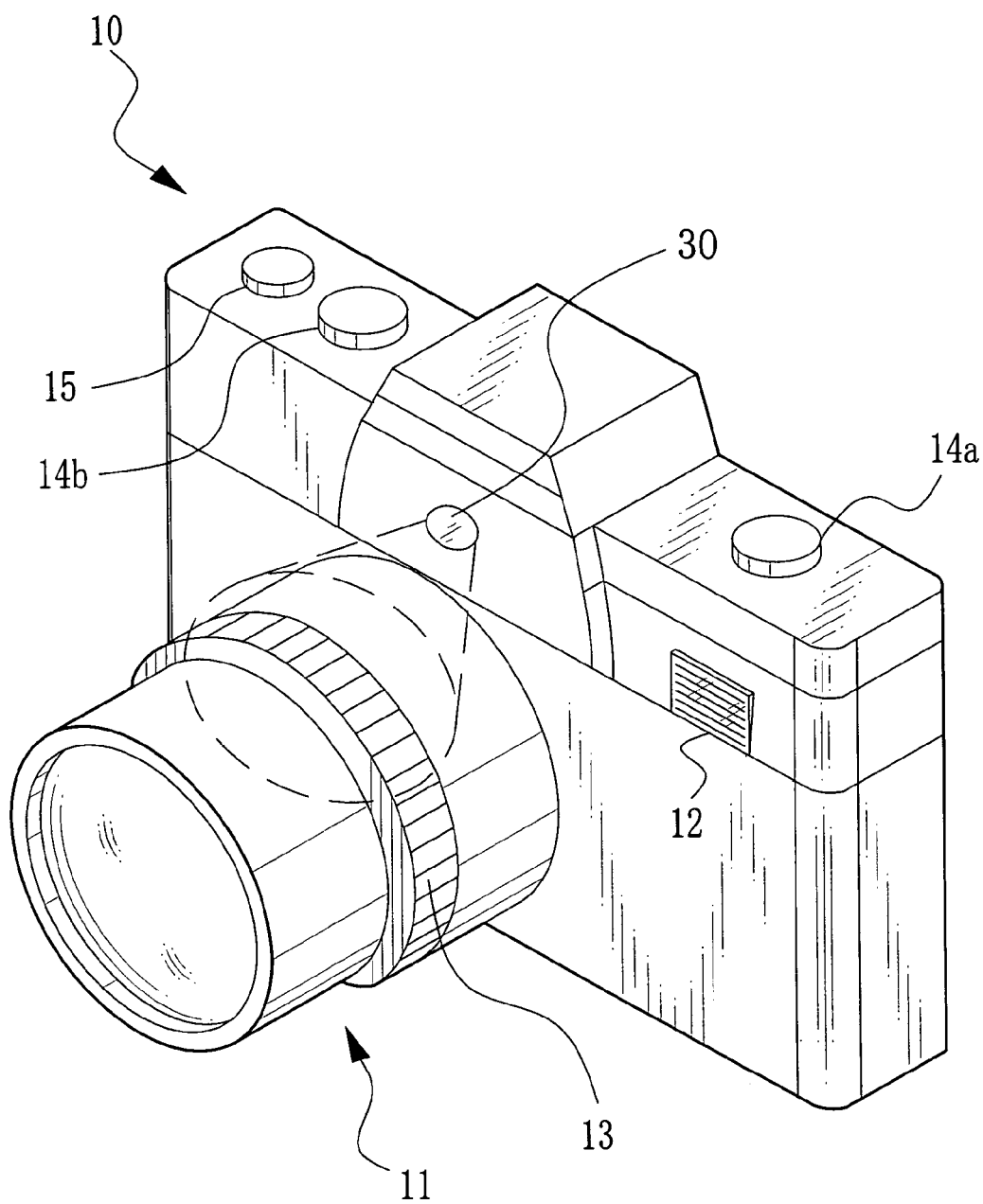
FIG. 4 is a perspective view showing a camera having an illumination emitter.

FIG. 4 shows an embodiment that the camera is provided with an illumination light emitter. An upper portion of the front face of the camera 10 is provided with an illumination light emitter 30. The operation ring 13 is illuminated by light emission from the illumination light emitter 30. The illumination light emitter 30 emits light by an operation of the illumination operation button 17 or the release button 15 as mentioned above. The illumination sensor 29 may also be used to inhibit light emission from the illumination light emitter 30 in bright places.

An external viewfinder or an external electronic view finder (EVF) may be used for the camera accessory in place of the external flash unit 16. Moreover, the LEDs are used in the illumination light emitters 18 and 30, but alternatively other light source, for example, electric lamps may be used. Furthermore, position of the illumination light emitter 30 is not limited to the upper front face of the camera 10, and alternatively it may be disposed at anywhere on the camera 10 as long as it can illuminate the operation ring 13 without affecting the images being captured.

Still furthermore, in the above embodiment, the lens barrel 11 is fixed to the camera 10. However, the lens barrel may be detachable from the camera.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera accessory removably attached to a camera having an operating portion comprising:

an illumination light emitter that generates light for illuminating said operating portion;
a communication section for receiving a signal representing that said operating portion of said camera is operated; and
a light emitting controller for turning on said illumination light emitter when said communication section receives said signal;
wherein said operating portion includes a release button and wherein said signal represents that said release button is pressed halfway; and
wherein said communication section further receives a full-press signal representing that said release button is fully pressed, and wherein said light emitting controller turns off said illumination light emitter when said full-press signal is received from said camera.

2. A camera accessory as claimed in claim 1, wherein said camera accessory is an external flash device detachably attached to said camera.

3. A camera accessory as claimed in claim 1, further including an illumination operation member for turning on/off said illumination light emitter.

4. A camera accessory as claimed in claim 1, further including:
an illumination detection sensor for measuring illuminance; and
a light emission inhibition device for inhibiting turning on of said illumination light emitter when said illuminance is at least a predetermined value.

5. A camera accessory as claimed in claim 1, wherein said light emitting controller turns off said illumination light emitter after a certain period of time since an operation of said operating portion was stopped.

6. A camera accessory as claim 1, in wherein said operating portion includes a release button and wherein said signal represents that said release button is touched by a user's finger.

7. A camera provided with a lens barrel having an operating portion that is operated by a user, said camera comprising:
an illumination light emitter that generates light for illuminating said operating portion;
a release button for starting image capturing; and
a light emitting controller for controlling turning on/off of said illumination light emitter, said light emitting controller turning on said illumination light emitter when said release button is pressed halfway and turning off said illumination light emitter when said release button is fully pressed.

8. A camera as claimed in claim 7, further including:
an illumination detection sensor for measuring illuminance; and
a light emission inhibition device for inhibiting turning on of said illumination light emitter when said illuminance is at least a predetermined value.

9. A camera as claimed in claim 7, further including:
a light emitting controller for turning on said illumination light emitter when said operating portion of said lens barrel is operated.

10. A camera as claimed in claim 7, wherein said light emitting controller turns off said illumination light emitter after a certain period of time since a half-press of said release button is stopped.

11. A camera provided with a lens barrel having an operating portion that is operated by a user, said camera comprising:
an illumination light emitter that generates light for illuminating said operating portion;
a release button for starting image capturing;
a touch sensor provided in said release button; and
a light emitting controller for controlling turning on/off of said illumination light emitter, said light emitting controller turning on said illumination light emitter when said touch sensor detects contact of a user's finger.

* * * * *